US012585618B2

(12) United States Patent  
Udayashankar et al.

(10) Patent No.: US 12,585,618 B2  
(45) Date of Patent: Mar. 24, 2026

(54) SYSTEMS AND METHODS FOR SEQUENCE-BASED DATA CHUNKING FOR DEDUPLICATION

(71) Applicant: Acronis International GmbH, Schaffhausen (CH)

(72) Inventors: Sreeharsha Udayashankar, Waterloo (CA); Abdelrahman Ba'ba', Waterloo (CA); Samer Al-Kiswany, Waterloo (CA); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 18/390,020

(22) Filed: Dec. 20, 2023

(65) Prior Publication Data

US 2025/0209043 A1      Jun. 26, 2025

(51) Int. Cl.  
*G06F 16/174* (2019.01)

(52) U.S. Cl.  
CPC ................................ *G06F 16/1752* (2019.01)

(58) Field of Classification Search  
CPC .................................................. G06F 16/1752  
USPC ......................................................... 707/762  
See application file for complete search history.

(56) References Cited

U.S. PATENT DOCUMENTS

| | | | | |
|---|---|---|---|---|
| 8,639,669 B1 * | 1/2014 | Douglis | ................... | G06F 3/061 707/692 |
| 10,809,945 B2 * | 10/2020 | Patwardhan | .......... | G06F 3/0673 |
| 10,887,372 B2 * | 1/2021 | Jang | ........................ | H04L 67/06 |
| 2013/0086009 A1 * | 4/2013 | Li | ........................ | G06F 16/1752 707/E17.009 |
| 2018/0196609 A1 * | 7/2018 | Niesen | ................... | G06F 3/0641 |
| 2021/0216497 A1 * | 7/2021 | Ramteke | ............... | G06F 16/113 |
| 2022/0004524 A1 * | 1/2022 | Chen | ................... | G06F 16/152 |

FOREIGN PATENT DOCUMENTS

| | | | | |
|---|---|---|---|---|
| KR | 100796176 | B1 * | 1/2008 | |
| WO | WO-2014184857 | A1 * | 11/2014 | ......... G06F 16/1752 |

OTHER PUBLICATIONS

Saeed, Ahmed Sardar M., et al., "Data Deduplication System Based on Content-Defined Chunking Using Bytes Pair Frequency Occurrence", Symmetry, vol. 12, Issue 11, Nov. 6, 2020, pp. 1-21.*

(Continued)

*Primary Examiner* — Robert Stevens  
(74) *Attorney, Agent, or Firm* — ArentFox Schiff LLP; Michael Fainberg

(57) ABSTRACT

Disclosed herein are systems and method for data chunking. In one aspect, a method includes consecutively scanning each respective byte in a byte stream of data. The method includes in response to detecting a first amount of adjacent bytes with values arranged in a decreasing order, marking a cut-off point of a data chunk comprising at least the adjacent bytes. The method includes in response to detecting a second amount of bytes with values arranged in an increasing order, executing a jump mechanism that skips scanning of a fixed amount of bytes after the bytes with values arranged in the increasing order. The method includes subsequent to scanning the byte stream in entirety, outputting a plurality of cut-off points of identified data chunks.

15 Claims, 7 Drawing Sheets

400

(56)          References Cited

OTHER PUBLICATIONS

Ajdari, Mohammadamin, et al., "FIDR: A Scalable Storage System for Fine-Grain Inline Data Reduction with Efficient Memory Handling", MICRO-52, Columbus, OH, Oct. 12-16, 2019, pp. 239-252.*

Jehlol, Hashem B., et al., "Big Data De-duplication Using Classification Scheme based on Histogram of File Stream", ITSS-IoE, Hadhramaut, Yemen, Dec. 3-5, 2022, 7 pages.*

Jehlol, Hashem Bedr, et al., "Big Data Backup: A Survey", International Journal of Scientific Research in Science, Engineering and Technology, vol. 9, Issue 4, Jul.-Aug. 2022, pp. 174-190.*

Yu, Chuanshuai, et al., "Leap-based Content Defined Chunking—Theory and Implementation", MSST 2015, Santa Clara, CA, 30 May-Jun. 5, 2015, 12 pages.*

Widodo et al., "A new content-defined chunking algorithm for data deduplication in cloud storage," Future Generation Computer Systems, 2017, vol. 71, pp. 145-156.

Xia et al., "FastCDC: A Fast and Efficient Content-Defined Chunking Approach for Data Deduplication," 2016 USENIX Annual Technical Conference, Jun. 22-24, 2016, pp. 101-114.

Zhang et al., "AE: An Asymmetric Extremum content defined chunking algorithm for fast and bandwidth-efficient data deduplication," 2015 IEEE Conference on Computer Communications (INFOCOM), Apr. 26-May 1, 2015, 9 pages.

* cited by examiner

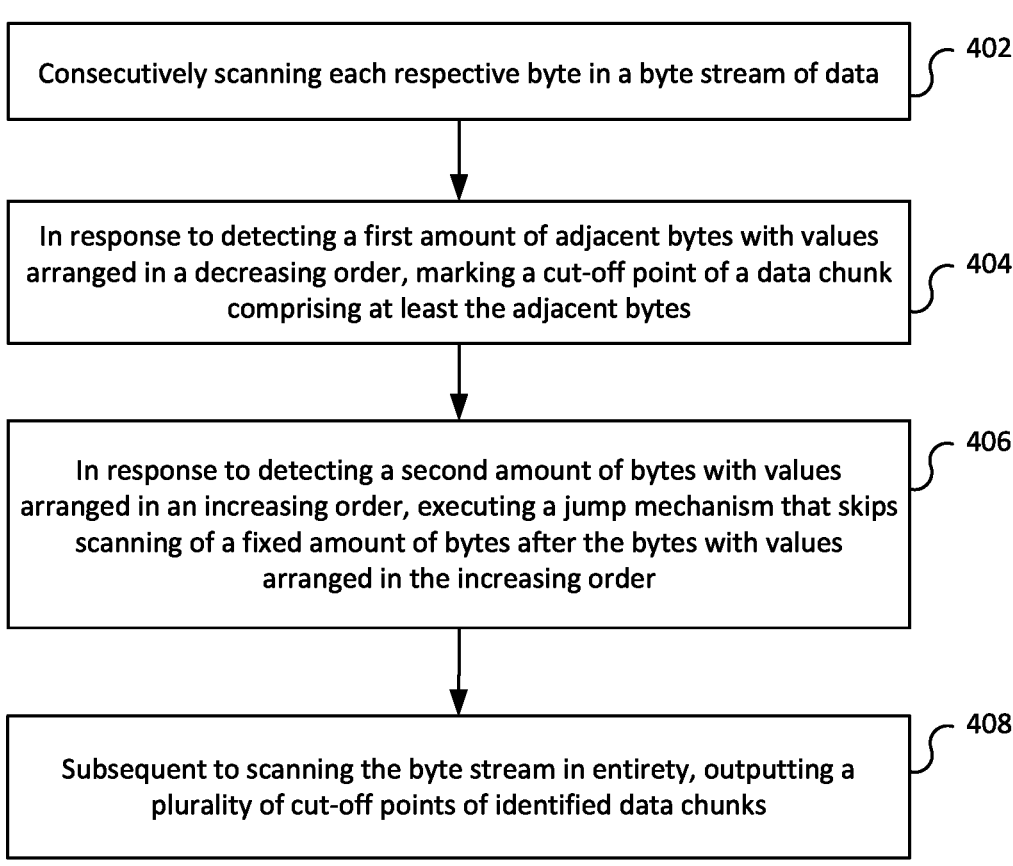

400

Consecutively scanning each respective byte in a byte stream of data — 402

In response to detecting a first amount of adjacent bytes with values arranged in a decreasing order, marking a cut-off point of a data chunk comprising at least the adjacent bytes — 404

In response to detecting a second amount of bytes with values arranged in an increasing order, executing a jump mechanism that skips scanning of a fixed amount of bytes after the bytes with values arranged in the increasing order — 406

Subsequent to scanning the byte stream in entirety, outputting a plurality of cut-off points of identified data chunks — 408

SYSTEMS AND METHODS FOR SEQUENCE-BASED DATA CHUNKING FOR DEDUPLICATION

FIELD OF TECHNOLOGY

The present disclosure relates to the field of data storage, and, more specifically, to systems and methods for performing sequence-based data chunking for deduplication.

BACKGROUND

Data deduplication plays a crucial role in backup systems. It optimizes both storage and bandwidth in said systems by eliminating redundant data. The efficiency of deduplication is significantly low when performed on whole files because any small change between two files can cause them to be treated as different files. Hence, files are usually divided into smaller pieces called chunks. Fixed size chunking is considered the simplest way of dividing files. However, it suffers from a boundary-shift problem, where any addition or removal of the file contents can change all subsequent chunks' boundaries. This lowers the deduplication efficiency.

Content-defined chunking (CDC) techniques address this problem by inserting chunk boundaries based on data attributes rather than relying on a predefined size. This approach achieves better deduplication efficiency, but it is significantly slower compared to fixed-size chunking due to the additional computation overhead needed to find the chunk boundary.

More specifically, conventional chunking techniques use either hashing (e.g., FastCDC) or windows within which they scan for minimum and maximum values. These approaches are slow, result in high chunk size variance, and differ widely in average chunk sizes.

SUMMARY

In one exemplary aspect, the techniques described herein relate to a method for data chunking, the method including: consecutively scanning each respective byte in a byte stream of data; in response to detecting a first amount of adjacent bytes with values arranged in a decreasing order, marking a cut-off point of a data chunk including at least the adjacent bytes; in response to detecting a second amount of bytes with values arranged in an increasing order, executing a jump mechanism that skips scanning of a fixed amount of bytes after the bytes with values arranged in the increasing order; and subsequent to scanning the byte stream in entirety, outputting a plurality of cut-off points of identified data chunks.

In some aspects, the techniques described herein relate to a method for data chunking, the method including: consecutively scanning each respective byte in a byte stream of data; in response to detecting a first amount of adjacent bytes with values arranged in an increasing order, marking a cut-off point of a data chunk including at least the adjacent bytes; in response to detecting a second amount of bytes with values arranged in a decreasing order, executing a jump mechanism that skips scanning of a fixed amount of bytes after the bytes with values arranged in the decreasing order; and subsequent to scanning the byte stream in entirety, outputting a plurality of cut-off points of identified data chunks.

In some aspects, the techniques described herein relate to a method, wherein the bytes with values arranged in the decreasing order are not all adjacent to one another.

In some aspects, the techniques described herein relate to a method, wherein a majority of the second amount of bytes are arranged in the decreasing order.

In some aspects, the techniques described herein relate to a method, wherein the second amount of bytes is incremented when a respective cut-off point is marked.

In some aspects, the techniques described herein relate to a method, wherein the second amount of bytes is reset to a default value when the jump mechanism is executed.

In some aspects, the techniques described herein relate to a method, further including: subsequent to identifying a data chunk by marking a respective cut-off point, determining an amount of bytes remaining in the byte stream; and in response to determining that the amount of bytes is less than the first amount of adjacent bytes, identifying the bytes remaining in the byte stream as a last data chunk in the byte stream.

In some aspects, the techniques described herein relate to a method, further including: identifying a desired throughput value; and setting the first amount, the second amount, and the fixed amount of bytes of the jump mechanism based on the desired throughput value.

In some aspects, the techniques described herein relate to a method, wherein identifying the desired throughput value includes: determining a size of the byte stream; receiving a threshold period of time to complete the data chunking; and calculating the desired throughput value based on the size of the byte stream and the threshold period of time.

In some aspects, the techniques described herein relate to a system for data chunking, including: at least one memory; and at least one hardware processor coupled with the at least one memory and configured, individually or in combination, to: consecutively scan each respective byte in a byte stream of data; in response to detecting a first amount of adjacent bytes with values arranged in an increasing order, mark a cut-off point of a data chunk including at least the adjacent bytes; in response to detecting a second amount of bytes with values arranged in a decreasing order, execute a jump mechanism that skips scanning of a fixed amount of bytes after the bytes with values arranged in the decreasing order; and subsequent to scanning the byte stream in entirety, output a plurality of cut-off points of identified data chunks.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 is a flowchart illustrating a method for performing sequence-based data chunking using a decreasing mode technique.

DETAILED DESCRIPTION

Exemplary aspects are described herein in the context of a system, method, and computer program product for performing sequence-based data chunking. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes a new sequence-based data chunking technique for data deduplication. Based on tests and evaluations, the disclosed technique achieves the same deduplication ratio (DER) as the state of the art while improving chunking throughput significantly across a range of datasets. For example, FastCDC is the fastest algorithm with the best DER among the state of the art. The disclosed technique matches the DER while possessing faster throughput than FastCDC.

Figure 1:
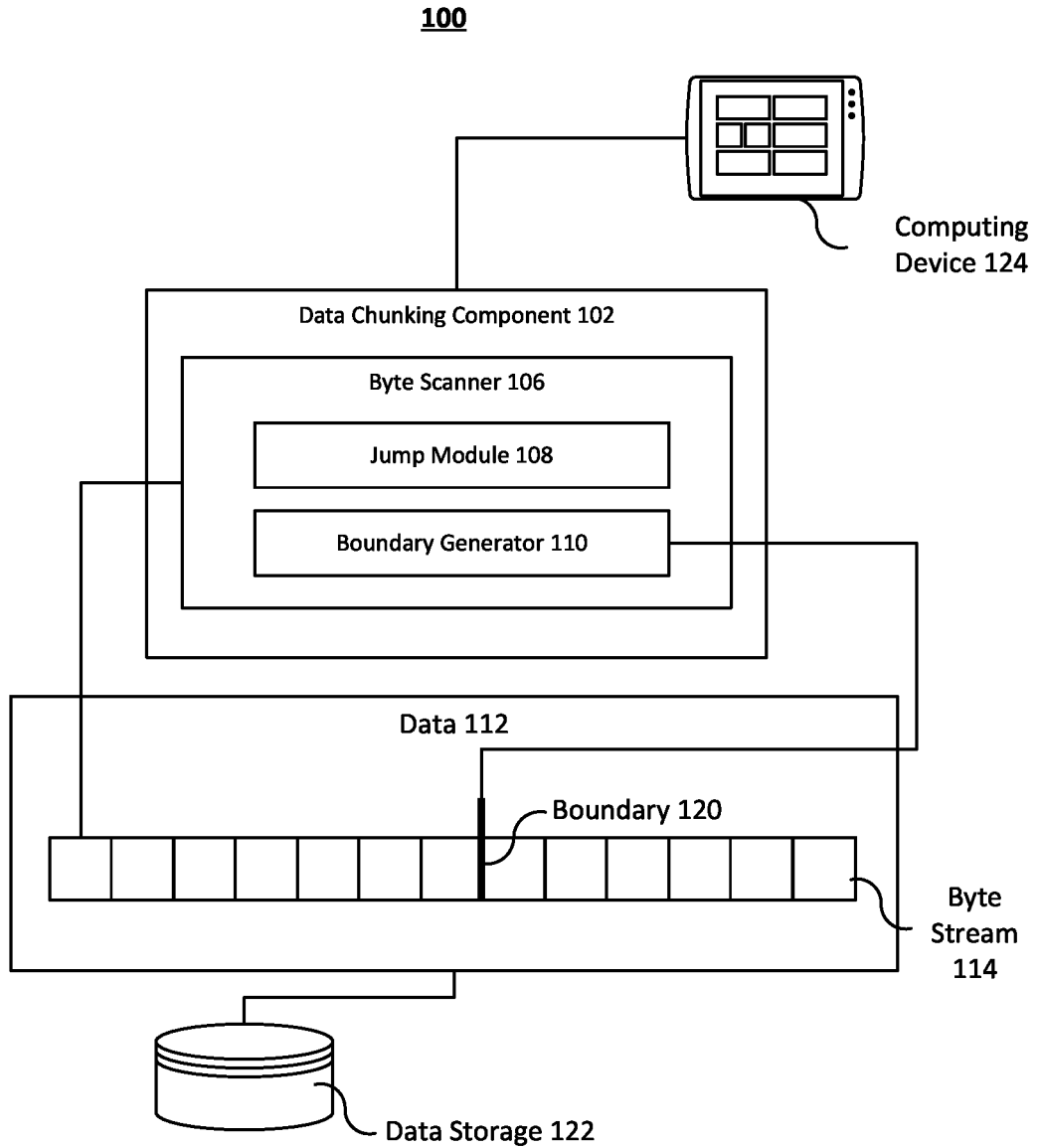
FIG. 1 is a block diagram illustrating a system for performing sequence-based data chunking.

FIG. 1 is a block diagram illustrating system 100 for executing jump-based content-defined data chunking. System 100 includes a data chunking component 102, which may be an application installed on a computing device 124 (e.g., computer system 20 of FIG. 4).

In some aspects, data chunking component 102 may be installed on the same computing device on which data that needs chunking is stored. For example, data chunking component 102 may perform chunking on data 112, which is stored on data storage 122 connected to computing device 124.

In some aspects, data chunking component 102 may be installed on a different computing device such as a remote server. For example, data storage 122 may upload data 112 to the remote server, from where data chunking component 102 may perform chunking. In this case, data chunking component 102 may transmit boundary information to data storage 122.

Data chunking component 102 includes a plurality of modules, namely, byte scanner 106, jump module 108, and boundary generator 110. To find a chunk boundary given a byte stream 114 of data 112, data chunking component 102 follows various chunking modes.

Data chunking component 102 three parameters: n, t and k, which are used to look for sequences of increasing or decreasing bytes (i.e. increasing mode or decreasing mode). In the increasing mode chunking technique, data chunking component 102 scans the input data byte by byte until either of the following conditions are met:

(1) a sequence of n adjacent bytes in increasing order is detected. In this case, boundary generator 110 inserts a chunk boundary here (i.e., consider the data until this point to be a single chunk). In some aspects, the values of t and k are incremented in response to generating a chunk;

(2) a t total bytes in decreasing order (not necessarily adjacent) is detected. In other words, t is the number of bytes with values less than the values of their directly prior byte. If this condition is met, jump module 108 skips scanning the next k bytes (i.e. jump across a section of the data). In some aspects, data chunking component 102 may then modify the current values of t and k to any value with a minimum of 1 byte.

Data chunking component 102 continues to scan the input data in this fashion until all bytes are scanned.

In some aspects, a user may select a particular throughput value for data chunking and data chunking component 102 may set the values of n, t, and k in order to achieve the desired throughput. For example, the user may want byte stream 114 of size A to be chunked within a threshold period of time T. Here, the throughput is given by TP=A/T. Data chunking component 102 may set the values of n, t, and k based on this desired TP using machine learning. For example, a machine learning algorithm may be trained with a training dataset where each training vector includes values of n, t, k, and an achieved TP. Once trained, the machine learning algorithm may predict a TP for a given input set of n, t, and k. The machine learning algorithm may thus be used to reverse engineer a set of n, t, k for a desired TP.

In general, the following relationships exist between n, t, k and TP:

(1) n is inversely proportional to throughput (i.e., increasing n leads to lower throughput as it is harder to find boundaries).

(2) t is inversely proportional to throughput (i.e., increasing t leads to lower throughput. This is because increasing t leads to lower number of jumps overall).

(3) k is directly proportional to throughput because as k increases, the amount of bytes skipped per jump increases.

Data chunking component 102 ultimately partitions byte stream 114 into chunks defined by cut-off points. These chunks are optimized for deduplication, as they are based on the content-defined principle, but now with higher throughput due to the skipping mechanism. Thus, the technique introduces novel features (primarily its unique skipping mechanism and the increasing/decreasing mode chunking techniques) that set it apart from existing technologies.

Traditional CDC methods scan the data byte by byte to determine chunk boundaries, which is computationally intensive and can limit throughput. The proposed method introduces a novel skipping mechanism. When the jump condition is satisfied, the technique jumps ahead by a defined number of bytes, effectively skipping over parts of the data. This approach accelerates chunking while also maintains a high deduplication ratio, addressing a key limitation of existing technologies. These innovations represent a significant advancement in content-defined chunking. By significantly enhancing throughput and maintaining high deduplication ratios, this method can effectively address the persistent issue of file chunking being the bottleneck in deduplication systems.

Figure 2:
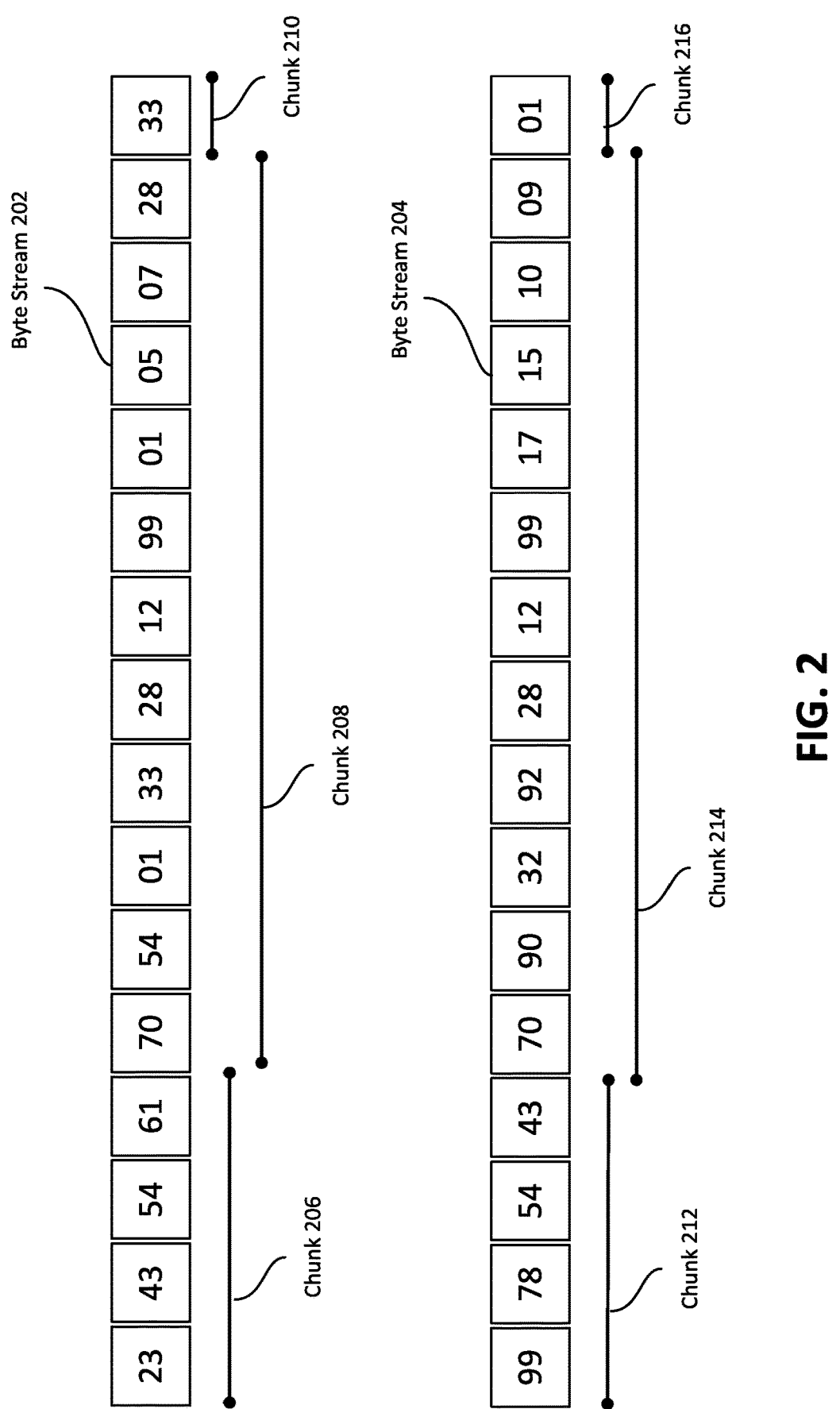
FIG. 2 illustrates examples of two byte steams with their respective chunks.

FIG. 2 illustrates two example byte steams with their respective chunks. Byte stream 202 and byte stream 204 both include two streams with 15 bytes each. One skilled in the art will appreciate that there may be any number of bytes in each byte stream, but only 15 are shown in each stream for simplicity.

Referring to byte stream 202, data chunking component 102 may use an increasing mode chunking technique. In this technique, data chunking component 102 performs a byte by byte scan and detects whether the following conditions are met:

Chunk Condition: A sequence of n adjacent bytes in increasing order (i.e., byte_n>byte_n-1> . . . >byte_2>byte_1) is detected.

Jump Condition: A total of t bytes in decreasing order (not necessarily adjacent) is detected.

In response to detecting that the chunk condition is met, data chunking component 102 marks all data until the nth byte to be part of a single chunk. In response to detecting that the jump condition is met, data chunking component 102 skips scanning of the next k bytes (i.e. jumps across a section of the data).

Suppose that n=4, t=3, and k=2.

When scanning byte stream 202, data chunking component 102 scans byte-by-byte. For the first 4 bytes, data chunking component 102 determines that the values of the bytes are arranged in an increasing order and are adjacent. In response to detecting 4 adjacent bytes with values arranged in increasing order, data chunking component 102 sets the first 4 bytes as part of chunk 206.

Then, starting from the $5^{th}$ byte, data chunking component 102 begins to rescan the bytes to determine whether either the chunk condition or jump condition is satisfied. Subsequent to scanning bytes 5 (value=70), 6 (value=54), 7 (value=01), 8 (value=33), and 9 (value=28), data chunking component 102 determines that the jump condition is satisfied because bytes 5-8 feature 3 bytes (equaling t) of decreasing value albeit in non-adjacent order. Suppose that c represents the current count of decreasing non-adjacent bytes. The value of c equals 0. When scanning byte 6, data chunking component 102 increments c to 1 because of the decrease in value from byte 5. When scanning byte 7, data chunking component 102 increments c to 2 because of the decrease in value from byte 6. When scanning byte 8, data chunking component 102 does not increment c. When scanning byte 9, data chunking component 102 increments c to 3 because of the decrease in value from byte 8. At this point, c equals t and data chunking component 102 determines that the jump condition is satisfied.

In response to determining that the jump condition is satisfied, data chunking component 102 skips the next 2 bytes (i.e., k=2), and begins scanning from byte 11 (value=01). Subsequent to scanning bytes 12 (value=05), 13 (value=07), and 14 (value=28), data chunking component 102 determines that the chunk condition is met. Accordingly, all bytes starting from the $5^{th}$ byte to the $14^{th}$ byte are set as part of chunk 208.

In some aspects, if there are less than n bytes remaining in a byte stream, data chunking component 102 sets the remaining bytes as part of a chunk. For example, the last byte in byte stream 202 is set as part of chunk 210. In some aspects, if the number of bytes remaining is less than the minimum desired chunk size, data chunking component 102 sets the remaining bytes as part of a chunk.

Referring to byte stream 204, data chunking component 102 may use a decreasing mode chunking technique. In this technique, data chunking component 102 performs a byte by byte scan and detects whether the following conditions are met:

Chunk Condition: A sequence of n adjacent bytes in decreasing order (i.e., byte_n<byte_n-1< . . . , <byte_2<byte_1) is detected.

Jump Condition: A total of t bytes in increasing order (not necessarily adjacent) is detected.

In response to detecting that the chunk condition is met, data chunking component 102 marks all data until the $n^{th}$ byte to be part of a single chunk. In response to detecting that the jump condition is met, data chunking component 102 skips scanning of the next k bytes (i.e. jumps across a section of the data).

Suppose that n=4, t=2, and k=3.

When scanning byte stream 204, data chunking component 102 scans byte-by-byte. For the first 4 bytes, data chunking component 102 determines that the values of the bytes are arranged in a decreasing order and are adjacent. In response to detecting 4 adjacent bytes with values arranged in decreasing order, data chunking component 102 sets the first 4 bytes as part of chunk 212.

Then, starting from the $5^{th}$ byte, data chunking component 102 begins to rescan the bytes to determine whether either the chunk condition or jump condition is satisfied. Subsequent to scanning bytes 5 (value=70), 6 (value=90), 7 (value=32), and 8 (value=92), data chunking component 102 determines that the jump condition is satisfied because bytes 5-8 feature two increases in byte values albeit in non-adjacent order. In response to determining that the jump condition is satisfied, data chunking component 102 skips the next 3 bytes (i.e., k=3), and begins scanning from byte 12 (value=17). Subsequent to scanning bytes 13 (value=15), 14 (value=10), and 15 (value=09), data chunking component 102 determines that the chunk condition is met. Accordingly, all bytes starting from the $5^{th}$ byte to the $15^{th}$ byte are set as part of chunk 214.

Data chunking component 102 sets the last byte in byte stream 204 as part of chunk 216 because there is one remaining byte to be scanned in byte stream 204, which is less than n.

Figure 3:
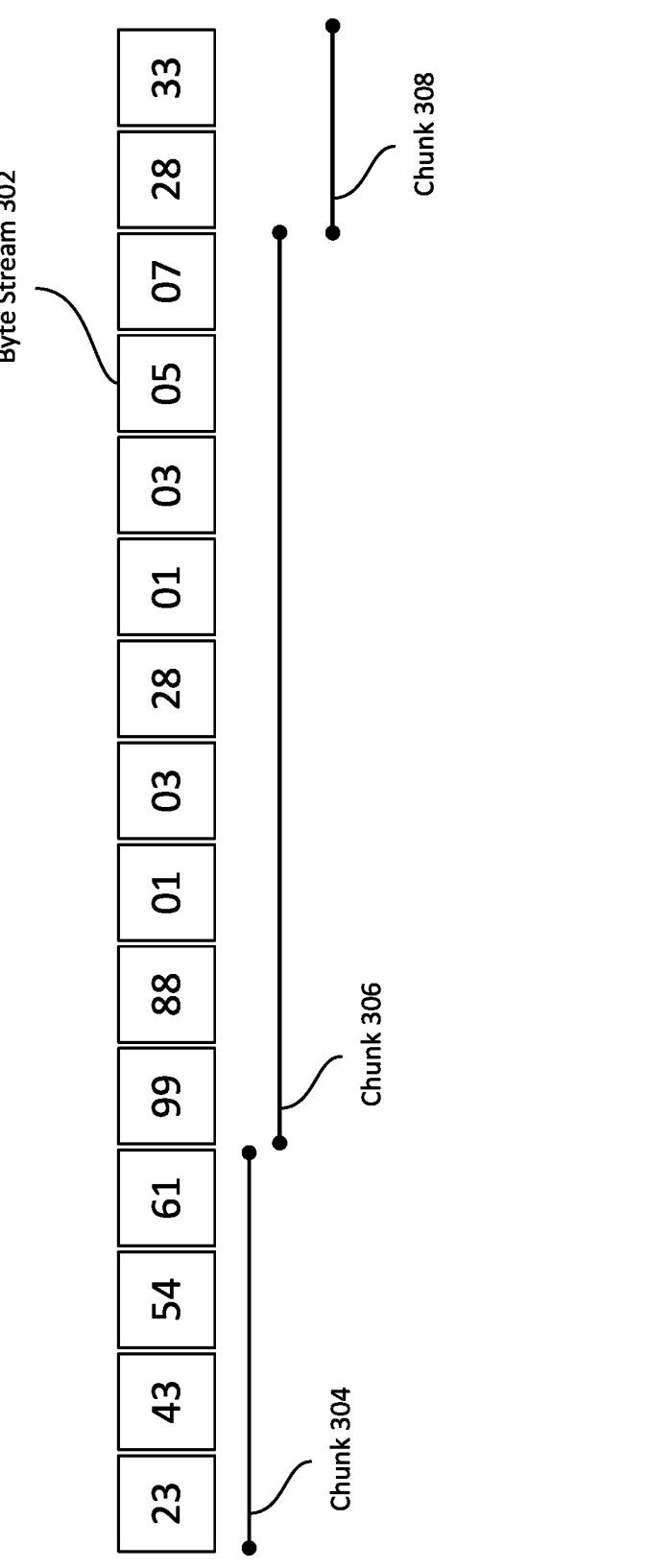
FIG. 3 illustrates an example of a byte steam with its respective chunks.

FIG. 3 illustrates an example of a byte steam with its respective chunks. In some aspects, the values of t and k may be incremented whenever a chunk is detected. When a jump condition is satisfied, data chunking component 102 may reset the values of t to 1 and/or k to 1. For example, when considering byte stream 302, suppose that initially n=4, t=1, and k=1 and data chunking component 102 is executing an increasing mode chunking technique.

Data chunking component 102 may scan the first four bytes and may set the first four bytes as chunk 304 because they satisfy the chunk condition. Data chunking component 102 then increments t and k to 2. Upon scanning bytes 5, 6, and 7, data chunking component 102 may detect 2 decreases in non-adjacent bytes, which equal t and thus satisfy the jump condition. Accordingly, data chunking component 102 skips the next 2 bytes and begins scanning at byte 10 (value=01). Due to the jump condition being satisfied, the values of t and k revert to 1.

Upon scanning bytes 10, 11, 12, and 13, data chunking component 102 determines that the chunking condition is met and sets bytes 5-13 as part of chunk 306. Data chunking component 102 then increments t and k to 2. The last two bytes are fewer than a desired minimum chunk size (e.g., 4), and are thus automatically set as a chunk 308 by data chunking component 102 as a response.

FIG. 4 is a flowchart illustrating a method 400 for performing sequence-based data chunking using a decreasing mode technique. At 402, data chunking component 102 begins consecutively scanning each respective byte in a byte stream (e.g., byte stream 114) of data (e.g., stored in data storage 122 of computing device 124). While scanning, at 404, in response to detecting a first amount (e.g., n) of adjacent bytes with values arranged in a decreasing order, data chunking component 102 marks a cut-off point of a data chunk comprising at least the adjacent bytes. While scanning, at 406, in response to detecting a second amount of bytes (e.g., t) with values arranged in an increasing order, data chunking component 102 executes a jump mechanism that skips scanning of a fixed amount of bytes (e.g., k) after the bytes with values arranged in the increasing order. At 408, subsequent to scanning the byte stream in entirety, data chunking component 102 outputs a plurality of cut-off points of identified data chunks.

Figure 5:
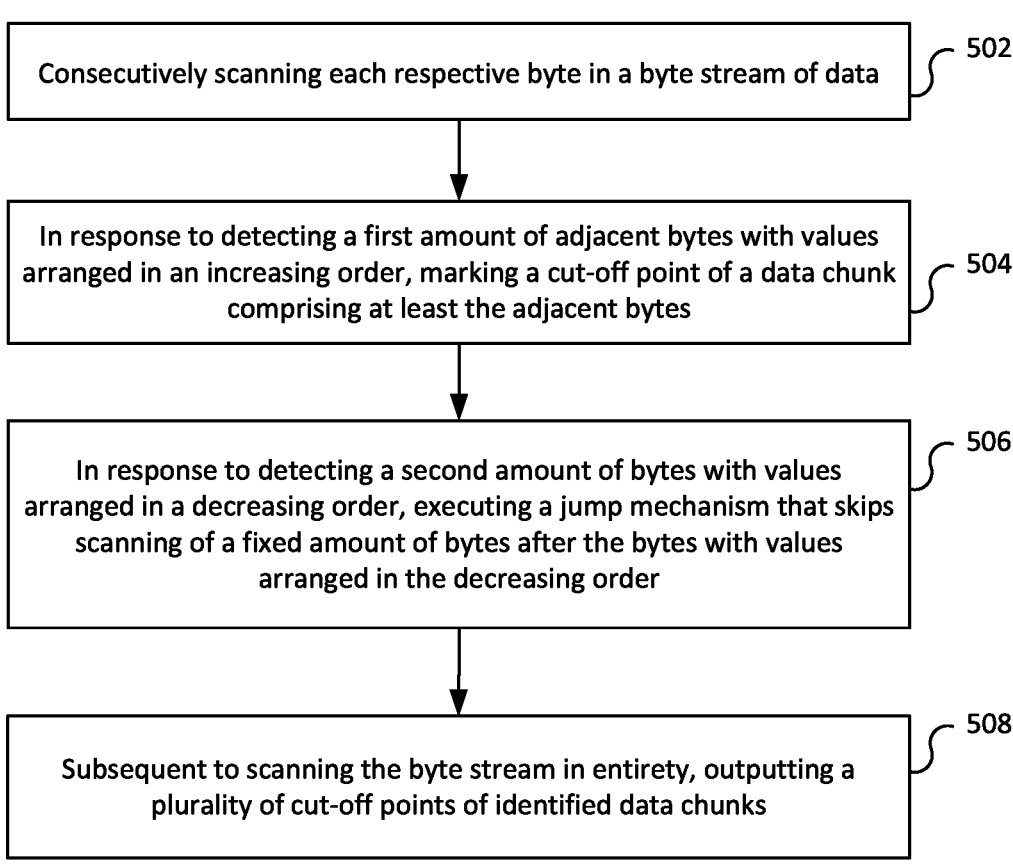
FIG. 5 is a flowchart illustrating a method for performing sequence-based data chunking using an increasing mode technique.

FIG. 5 is a flowchart illustrating a method 500 for performing sequence-based data chunking using an increasing mode technique. At 502, data chunking component 102 begins consecutively scanning each respective byte in a byte stream of data. While scanning, at 504, in response to detecting a first amount (e.g., n) of adjacent bytes with values arranged in an increasing order, data chunking component 102 marks a cut-off point of a data chunk comprising at least the adjacent bytes. While scanning, at 506, in response to detecting a second amount of bytes (e.g., t) with values arranged in a decreasing order, data chunking component 102 executes a jump mechanism that skips scanning of a fixed amount of bytes (e.g., k) after the bytes with values arranged in the decreasing order. In some aspects, the bytes with values arranged in the decreasing order are not all adjacent to one another. In particular, a majority of the second amount of bytes are arranged in the decreasing order.

At 508, subsequent to scanning the byte stream in entirety, data chunking component 102 outputs a plurality of cut-off points of identified data chunks.

In some aspects, the second amount of bytes is incremented when a respective cut-off point is marked. In some aspects, the second amount of bytes is reset to a default value when the jump mechanism is executed.

In some aspects, subsequent to identifying a data chunk by marking a respective cut-off point, data chunking component 102 determines an amount of bytes remaining in the byte stream. In response to determining that the amount of bytes is less than the first amount of adjacent bytes or a desired chunk size, data chunking component 102 identifies the bytes remaining in the byte stream as a last data chunk in the byte stream.

In some aspects, data chunking component 102 identifies a desired throughput value and sets the first amount, the second amount, and the fixed amount of bytes of the jump mechanism based on the desired throughput value. In some aspects, identifying the desired throughput value comprises determining a size of the byte stream, receiving a threshold period of time to complete the data chunking, and calculating the desired throughput value based on the size of the byte stream and the threshold period of time.

Figure 6:
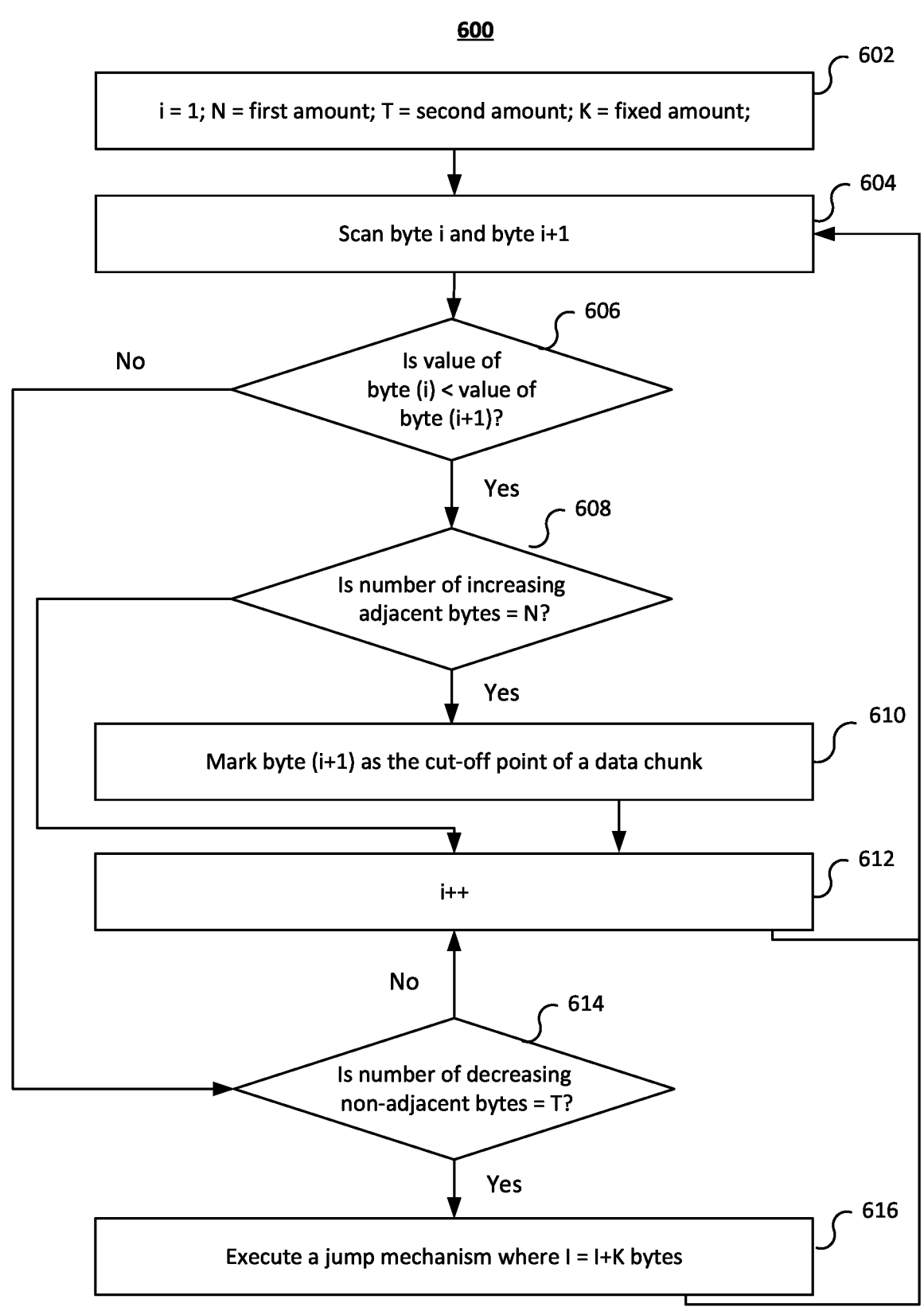
FIG. 6 is a flowchart illustrating a method scanning a byte stream using an increasing mode technique.

FIG. 6 is a flowchart illustrating a method 600 scanning a byte stream using an increasing mode technique. At 602, data chunking component 102 initiates the values of i, N, T, and K. For example, I=1, N=4, T=4, and K=2. At 604, data chunking component 102 begins scanning bytes I and I+1 of a byte stream. At 606, data chunking component 102 determines whether the value of byte I is less than the value of byte I+1. If yes, method 600 proceeds to 608, where data chunking component 102 determines whether the number of increasing adjacent bytes is equal to N. If yes, method 600 advances to 610, where data chunking component 102 marks byte I+1 as the cut-off point of a data chunk. Method 600 then continues to 612, where data chunking component 102 increments I by 1. Method 600 then returns to 604 and data chunking component 102 begins to scan for the next data chunk.

If at 606 data chunking component 102 determines that the value of byte I is not less than the value of I+1, method 600 advances to 614, where data chunking component 102 determines whether the number of decreasing non-adjacent bytes equals T. If not, method 600 returns to 612. Otherwise, method 600 advances to 616, where data chunking component 102 executes a jump mechanism whether the value of I is increased by K. Method 600 then returns to 604.

Figure 7:
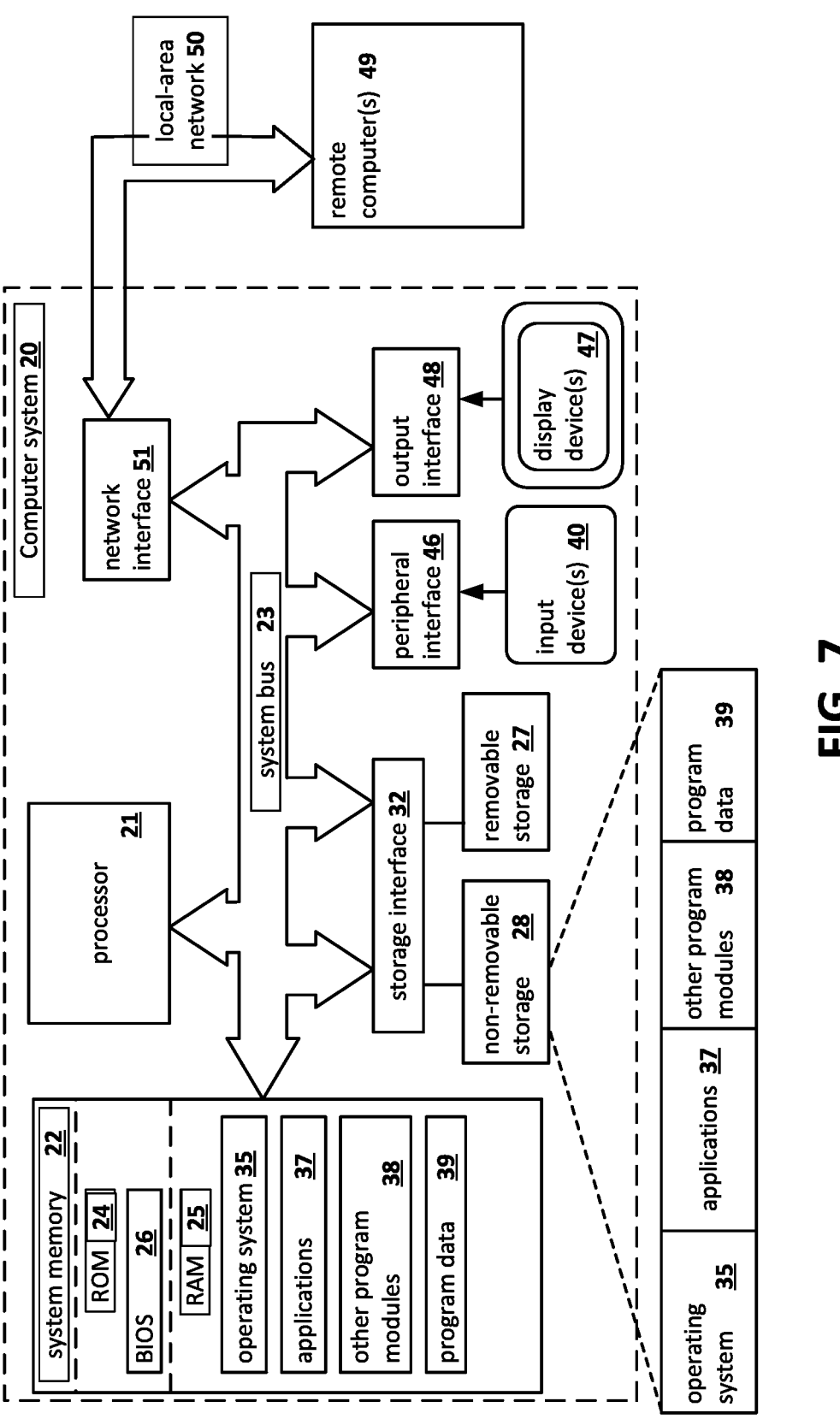
FIG. 7 presents an example of a general-purpose computer system on which aspects of the present disclosure can be implemented.

FIG. 7 is a block diagram illustrating a computer system 20 on which aspects of systems and methods for performing sequence-based data chunking may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-6 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for data chunking, the method comprising:

identifying, by a hardware processor, a desired throughput value for data chunking a byte stream of data by:

determining, by the hardware processor, a size of the byte stream;

receiving, by the hardware processor, a threshold period of time to complete the data chunking; and calculating, by the hardware processor, the desired throughput value based on the size of the byte stream and the threshold period of time;

setting, by the hardware processor, a first amount of adjacent bytes, a second amount of bytes, and a fixed amount of bytes of a jump mechanism that achieve the desired throughput value;

consecutively scanning, by the hardware processor, each respective byte in the byte stream of data;

in response to detecting the first amount of adjacent bytes with values arranged in a decreasing order, marking, by the hardware processor, a cut-off point of a data chunk comprising at least the adjacent bytes;

in response to detecting the second amount of bytes with values arranged in an increasing order, executing, by the hardware processor, the jump mechanism that skips scanning of the fixed amount of bytes after the bytes with values arranged in the increasing order; and subsequent to scanning the byte stream in entirety, outputting, by the hardware processor, a plurality of cut-off points of identified data chunks.

2. The method of claim 1, wherein setting the first amount of adjacent bytes, the second amount of bytes, and the fixed amount of bytes of the jump mechanism that achieve the desired throughput value comprises executing a machine learning model trained to calculate for an input throughput value: an output amount of adjacent bytes, an output amount of bytes, and an output amount of bytes for the jump mechanism.

3. The method of claim 2, wherein the machine learning model is trained on a training dataset comprising output byte amounts for various input throughput values.

4. A method for data chunking, the method comprising:

identifying, by a hardware processor, a desired throughput value for data chunking a byte stream of data by:

determining, by the hardware processor, a size of the byte stream;

receiving, by the hardware processor, a threshold period of time to complete the data chunking; and calculating, by the hardware processor, the desired throughput value based on the size of the byte stream and the threshold period of time;

setting, by the hardware processor, a first amount of adjacent bytes, a second amount of bytes, and a fixed amount of bytes of a jump mechanism based on the desired throughput value;

consecutively scanning, by the hardware processor, each respective byte in the byte stream of data;

in response to detecting the first amount of adjacent bytes with values arranged in an increasing order, marking, by the hardware processor, a cut-off point of a data chunk comprising at least the adjacent bytes;

in response to detecting the second amount of bytes with values arranged in a decreasing order, executing, by the hardware processor, the jump mechanism that skips scanning of the fixed amount of bytes after the bytes with values arranged in the decreasing order; and subsequent to scanning the byte stream in entirety, outputting, by the hardware processor, a plurality of cut-off points of identified data chunks.

5. The method of claim 4, wherein the bytes with values arranged in the decreasing order are not all adjacent to one another.

6. The method of claim 5, wherein a majority of the second amount of bytes are arranged in the decreasing order.

7. The method of claim 4, wherein one or both of the first amount of adjacent bytes and the second amount of bytes is incremented when a respective cut-off point is marked.

8. The method of claim 4, wherein one or both of the first amount of adjacent bytes and the second amount of bytes is reset to a default value when the jump mechanism is executed.

9. The method of claim 4, further comprising:

subsequent to identifying a data chunk by marking a respective cut-off point, determining an amount of bytes remaining in the byte stream; and in response to determining that the amount of bytes is less than the first amount of adjacent bytes, identifying the bytes remaining in the byte stream as a last data chunk in the byte stream.

10. A system for data chunking, comprising:

at least one memory; and at least one hardware processor coupled with the at least one memory and configured, individually or in combination, to:

identify a desired throughput value for data chunking a byte stream of data by:

determining a size of the byte stream;

receiving a threshold period of time to complete the data chunking; and calculating the desired throughput value based on the size of the byte stream and the threshold period of time;

set a first amount of adjacent bytes, a second amount of bytes, and a fixed amount of bytes of a jump mechanism that achieve the desired throughput value;

consecutively scan each respective byte in the byte stream of data;

in response to detecting the first amount of adjacent bytes with values arranged in an increasing order, mark a cut-off point of a data chunk comprising at least the adjacent bytes;

in response to detecting the second amount of bytes with values arranged in a decreasing order, execute the jump mechanism that skips scanning of the fixed amount of bytes after the bytes with values arranged in the decreasing order; and subsequent to scanning the byte stream in entirety, output a plurality of cut-off points of identified data chunks.

11. The system of claim 10, wherein the bytes with values arranged in the decreasing order are not all adjacent to one another.

12. The system of claim 11, wherein a majority of the second amount of bytes are arranged in the decreasing order.

13. The system of claim 10, wherein the second amount of bytes is incremented when a respective cut-off point is marked.

14. The system of claim 10, wherein the second amount of bytes is reset to a default value when the jump mechanism is executed.

15. The system of claim 10, wherein the at least one hardware processor is further configured to:

subsequent to identifying a data chunk by marking a respective cut-off point, determine an amount of bytes remaining in the byte stream; and in response to determining that the amount of bytes is less than the first amount of adjacent bytes, identify the bytes remaining in the byte stream as a last data chunk in the byte stream.

\* \* \* \* \*